June 25, 1968  J. C. CLARK  3,389,543

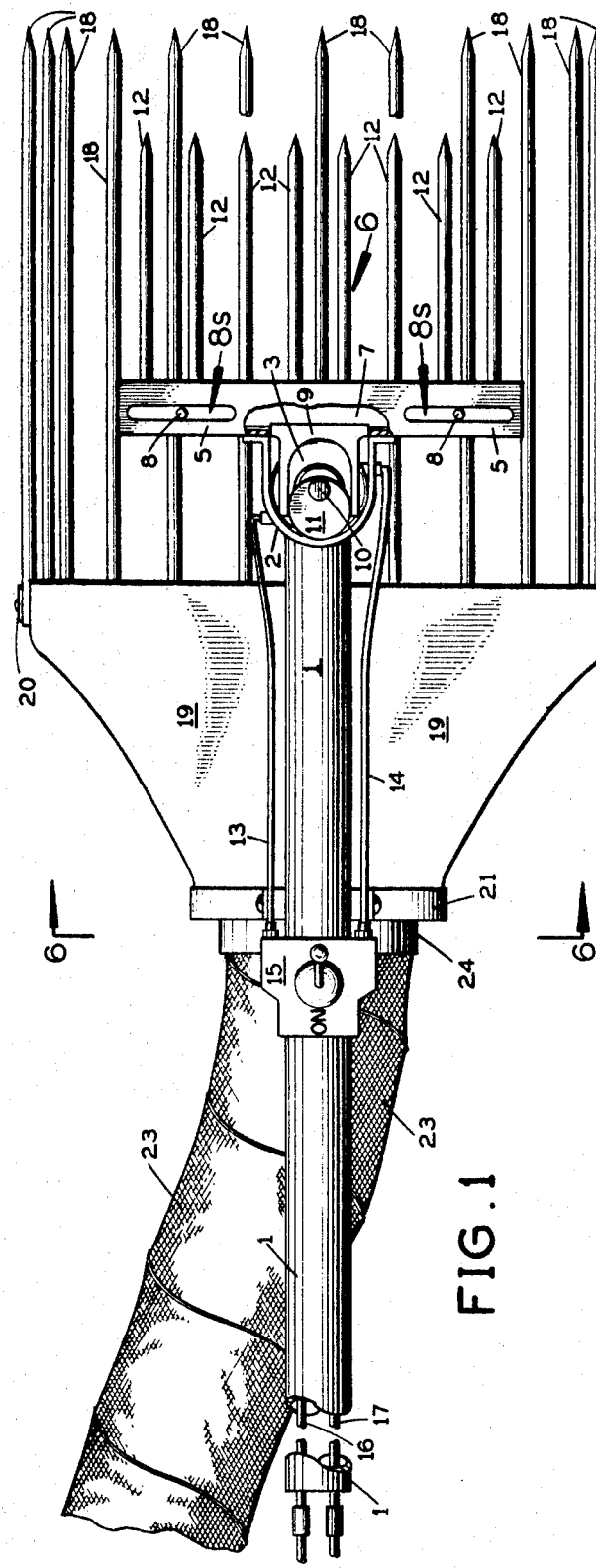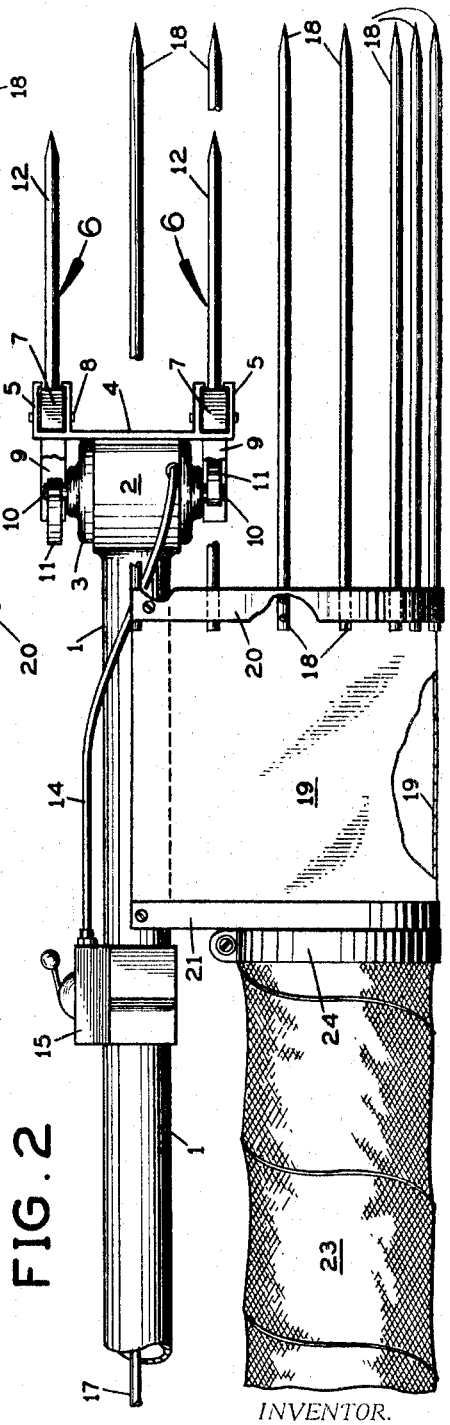

FRUIT PICKING APPARATUS

Filed Aug. 31, 1965  3 Sheets-Sheet 2

*INVENTOR.*
JOSEPH C. CLARK
BY
*Lloyd J. Andres*

June 25, 1968   J. C. CLARK   3,389,543
FRUIT PICKING APPARATUS
Filed Aug. 31, 1965   3 Sheets-Sheet 3

INVENTOR.
JOSEPH C. CLARK
BY
Lloyd Sanders

United States Patent Office 3,389,543
Patented June 25, 1968

3,389,543
FRUIT PICKING APPARATUS
Joseph C. Clark, 4843 Bachacher Lane,
Orlando, Fla. 32806
Filed Aug. 31, 1965, Ser. No. 484,051
4 Claims. (Cl. 56—337)

ABSTRACT OF THE DISCLOSURE

A device for harvesting fruit, having a pair of spaced multi-tine forks adapted and constructed for mutual lateral oscillation and driven by a motor means for picking fruit positioned between the forks for gravitation into a conveyor tube attached to the device.

---

This invention relates in general to agricultural machinery and more particularly to an apparatus for picking fruit from trees, particularly the larger type of fruit, such as the citrus variety.

Labor saving and efficient mechanized equipment for fruit picking has long been desired by the fruit growers and apparatus prior to this invention have been wanting or ineffective in many respects. Such prior art includes power devices for gripping and shaking the tree or branches thereof for releasing the fruit to descend by gravity into collection hoppers for manual handling therefrom into boxes for transport. This procedure is undesirable because of damage to the trees by breakage of branches and the laceration of bark thereon and/or the loosening of the root structure of the trunk in the soil.

Many other forms of prior picking devices included manually operated gripping or shearing appliances which would individually pick the fruit or cut same from the branches and conduct same into a container. This form of picking is slow, laborious, and often rendered damage to the fruit itself.

The present invention overcomes the above objections and disadvantages by the provision of a device based on a pair of equi-spaced forks adapted and constructed for power reciprocation substantially in horizontal planes and secured to the end of a hollow handle or other supporting member whereby the stems only supporting the fruit are oscillated with sufficient intensity to dislodge the fruit therefrom including collection means secured to the handle for collecting and guiding the dislodged fruit into flexible conduit for gravitation to a container, which construction is a principal object of the invention.

Another object of the invention is the provision of a pair of equi-spaced multi-tine forks journalled for reciprocation at the end of a handle including a power driven transmission means for simultaneously oscillating the forks in their spaced planes and in opposite directions for manual insertion above one or more of the fruit and oscillating the stems normally holding same for dislodging the fruit therefrom.

A further object of the invention is the provision of a manually operable handle having a pair of multi-tine forks at the outer end thereof which each of the forks in spaced relation and journalled for simultaneous reciprocation in opposite directions including a power driven transmission means connecting said forks for reciprocating same.

Another object of the invention is the provision of a pair of spaced forks having parallel tines retained for simultaneous reciprocation at the end of a manually operable handle member including a motive power means connected with said forks for reciprocating same when the motive means is energized.

Another object of the invention is the provision of a fork means positioned at the end of a manually operable handle member with said fork means adapted to predetermined reciprocation in a substantially horizontal position including a fixed fork means secured to said handle member under said reciprocating fork for collecting and conducting the dislodged fruit into a conduit when operated.

These and other objects and advantages in one embodiment of the invention are described and shown in the attached specification and drawings, in which:

FIG. 1 is a fragmentary plan view of the picking device in reduced scale.

FIG. 2 is a fragmentary side elevation of the device shown in FIG. 1.

Figure 3:
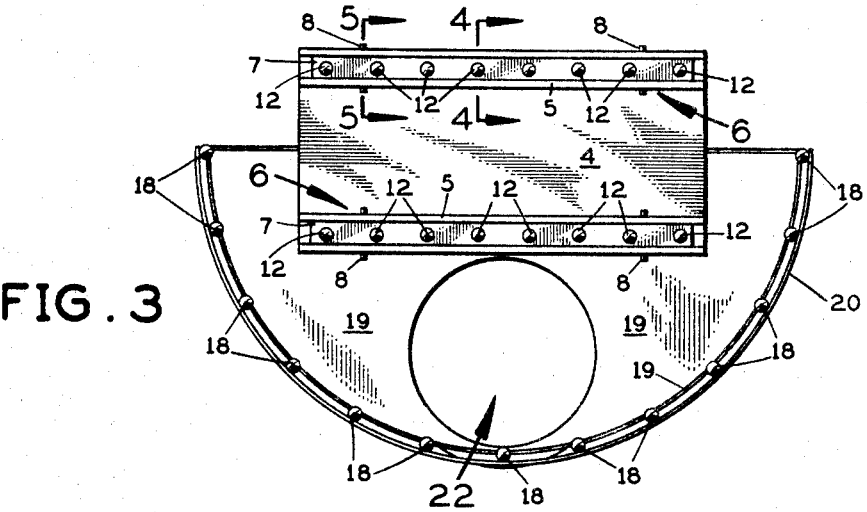
FIG. 3 is an end elevation of the device shown in FIG. 1.

Referring to FIGS. 1 and 2, the entire apparatus is secured to a hollow handle or supporting member 1 on the outer end of which is mounted a housing 2 for supporting a gear motor 3 having an internal speed reducer, not shown. A fork support member 4 is centrally secured to the outer end of housing 2 and is provided with a pair of integral channel means 5 in parallel spaced relation, as shown.

A pair of picking fork assemblies 6 with each having a spreader 7, slidably secured in each channel means 5 by pins 8 projecting through slots 8s, as shown. Each spreader 7 is provided with an integral eccentric follower 9 projecting through a central elongated slot in the rear side of member 4.

Figure 4:
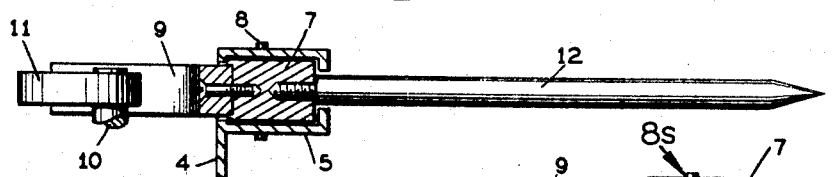
FIG. 4 is a cross sectional side elevation taken through section line 4—4, FIG. 3.
Figure 5:
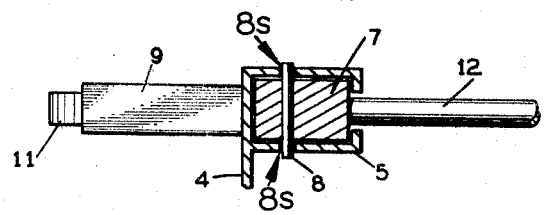
FIG. 5 is a cross sectional side elevation taken through section line 5—5, FIG. 3.
Figure 6:
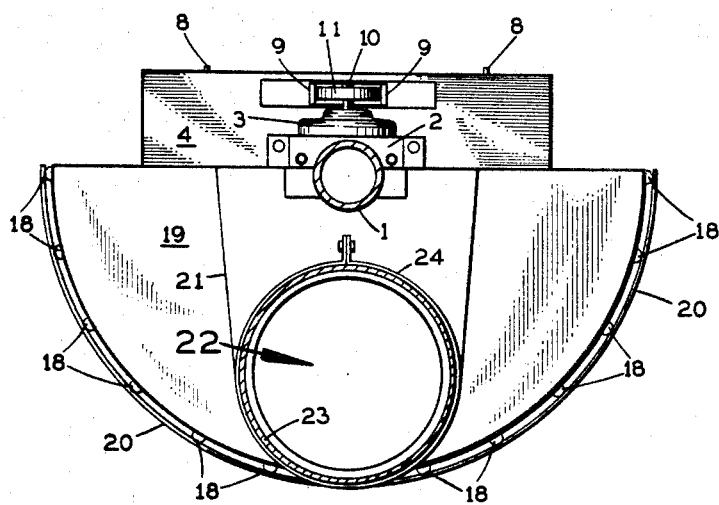
FIG. 6 is a cross sectional rear elevation taken through section line 6—6, FIG. 1.

The motor 3 is provided with a vertical drive shaft 10 and has an eccentric 11 secured at each opposite end thereof in opposing positions within the inner parallel surfaces of each of the followers 9, respectively. Thus the fork assemblies 6 will be reciprocated with a minimum of vibration in supporting member 1. Each spreader 7 has secured therein a plurality of rigid pointed tines 12 secured in co-planar relation, as shown in FIGS. 1 and 4. Although eight tines are shown secured in each spreader, the number and spacing may be varied to suit the harvesting of a fruit of a particular size range.

In this particular embodiment, and because of the general availability of hydraulic power, the motor 3 is a hydraulic type and connected by feed and return lines 13 and 14, respectively, under the control of valve means 15 and secured on handle member 1, as shown. The fluid supply and return lines 16 and 17, respectively, are retained within the supporting member 1 and normally are connected to a source of hydraulic power by flexible hose.

It is apparent that an electric or pneumatic motor may be substituted for the hydraulic motor 3 to obtain like reciprocating action of the fork assemblies 6.

Referring to FIGS. 1, 2, and 3, the collector fork is provided with a plurality of parallel pointed tines 18 positioned in a semi-cylindrical plane and secured to a funnel-like tapered housing 19 of sheet material reinforced by a band 20 which in turn is secured to supporting member 1 by a support 21. Like the harvester 12 the number and spacing of the tines 18 may be varied to suit a particular range of size of fruit.

A circular aperture 22 at the rear of housing 19 is positioned below fork assemblies 6, as shown in FIG. 2, and flexible conduit 23, preferably made of fabric is connected to housing 19 around aperture 22 by a clamp 24, as shown.

Figure 7:
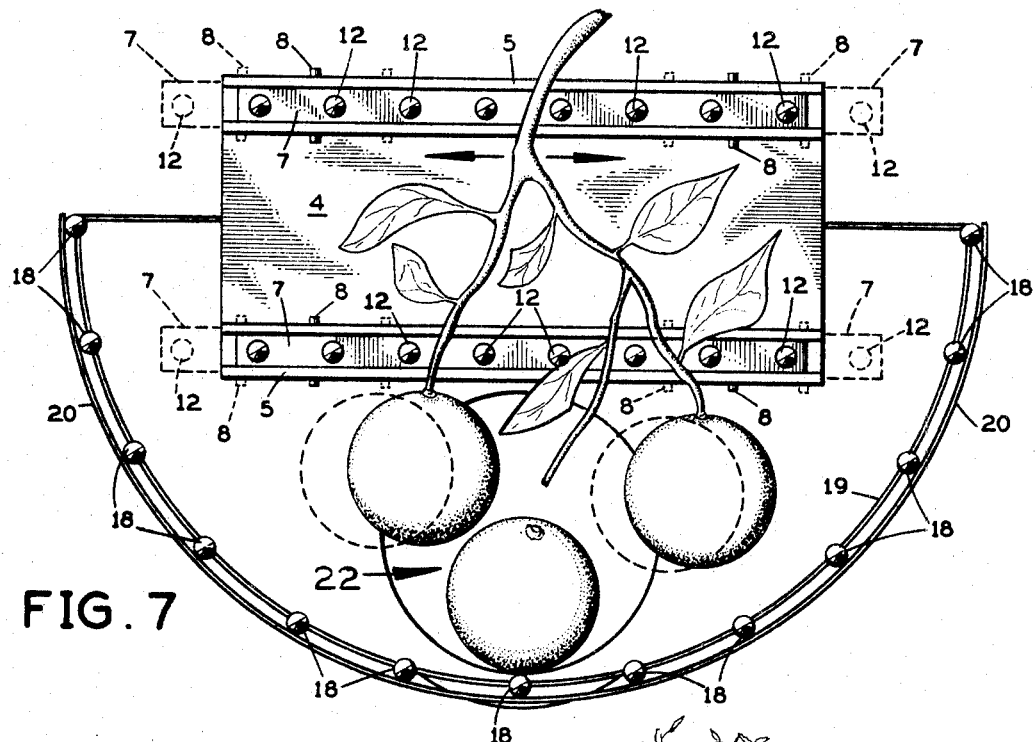
FIG. 7 is an enlarged front elevation engaging a fruit being picked.

In operation and referring to FIGS. 1 and 7, the device is energized by throwing the lever of the valve means 15 to its "on" position which will energize gear motor 3 and rotate both eccentrics 11 and thus simultaneously reciprocate both spreaders 7 and the tines 12 secured thereto to opposite directions, as illustrated in dotted lines in FIG. 7.

It has been found that in the case of picking oranges a desirable frequency of reciprocation for the fork assembly 6 is in the order of 15 cycles per second with an amplitude of approximately two inches, as illustrated. Certain modifications to both the frequency and amplitude may be widely varied to suit modification of construction and to provide optimum conditions for the type of fruit harvested.

When the tines 12 are moved into the tree and the branches and twigs are positioned between the tines 12 closely above the fruit, then the oscillatory motion, often angular, will oscillate the stems of the fruit and dislodge the latter therefrom without damage to the end twigs or stems.

Figure 8:
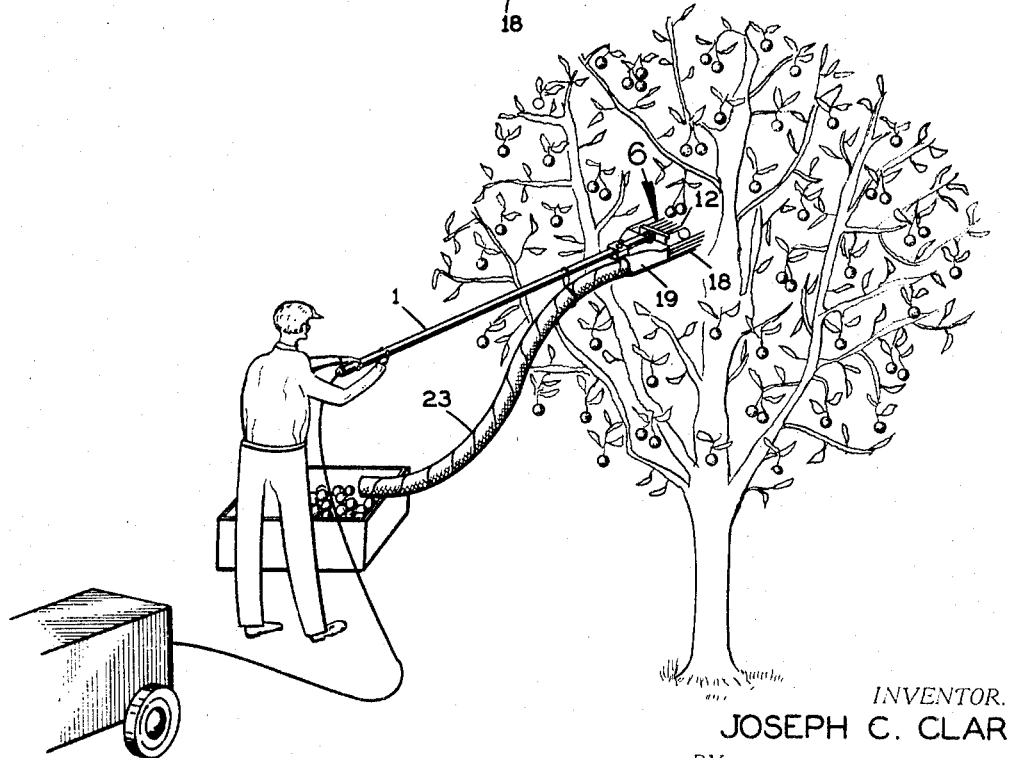
FIG. 8 illustrates picking apparatus as used picking fruit from a typical tree.

It is to be noted that the lateral reciprocation of the tines will impart, in most cases, an angular oscillatory motion to the stems of the fruit which will impart a degree of rotation to the fruit and inherently assist in detaching the stems therefrom largely because of the static inertia thereof. The fruit will then descend by gravity to the fixed tines 18 where they will roll rearward and be guided by housing 19 through aperture 22 and thence into the conducting conduit 23 for further gravitation into a transport receptacle, as illustrated in FIG. 8.

It is thus apparent that little if any damage is done to the tree during the picking operation and that an operator can pick all of the available fruit from the tree in a relatively short time, as compared with the conventional hand ladder system.

The device will operate with reasonable efficiency when only one of the forks 6 is caused to reciprocate; however, this operation results in an increase in vibration in the supporting member. It is also to be noted that the spacing of the tines of the forks 6 and the relative spacing of the forks themselves may be varied in alternate constructions to suit fruit of substantially different diameters.

It has been found that the fork assemblies 6 may be pivotally secured to support member 4 and oscillated about the pivotal axis by the means described for producing substantially the same results in dislodging fruit from their stems without damage to the latter or the branches of the tree.

It is understood that certain other modifications in the construction, utilizing the features above described, are intended to come within the scope of the appended claims.

Having described my invention, I claim:

1. A fruit picking device comprising a means forming a supporting member,
   a fork support means secured to the outer end of said supporting member,
   a fork means having a plurality of parallel spaced tines thereon in substantially co-planar relation,
   a pair of said fork means retained in substantially equi-spaced relation on said member with said tines parallel to said supporting member,
   at least one of said fork means journalled for predetermined reciprocation transverse to the axis of said supporting member,
   power driven transmission means on said supporting member connected with at least one of said fork means for reciprocating same when energized,
   a source of energy connected to said transmission means whereby the insertion of said pairs of fork means into fruit bearing tree stems above said fruit in close proximity therewith will oscillate the said stems and dislodge said fruit therefrom for descent by gravity.

2. The construction recited in claim 1 including a plurality of collector tines secured to said supporting member and positioned in spaced relation under said pair of said first mentioned tines,
   a tapered housing means connecting the rear ends of said collector tines and tapering into a delivery aperture,
   a flexible conduit of predetermined length connected to said housing means at the said aperture whereby fruit gravitating from said first mentioned fork means will be sequentially guided by said collector tines and said housing means through said aperture and through said conduit for collection in a transport receptacle.

3. A fruit picking device comprising a means forming a handle member,
   a fork support means secured to the outer end of said handle member,
   a fork means having a plurality of parallel spaced tines thereon in substantially co-planar relation,
   a pair of said fork means retained in substantially equi-spaced relation on said support means with said tines substantially parallel to said handle member,
   both of said fork means journalled for predetermined reciprocation in said equi-spaced relation on said member transverse to the axis of said handle member,
   a motor transmission means on said handle member adapted for movement when energized,
   a pair of cam means on said transmission means adapted to be rotated thereby connected with each one of said fork means for predetermined reciprocation in opposite directions respectively when said motor is energized,
   a source of energy connected to said motor means for operating the latter whereby the insertion of said pair of fork means into fruit bearing tree stems above said fruit in close proximity therewith will oscillate the said stems and dislodge said fruit therefrom for descent by gravity.

4. A fruit picking device comprising a means forming a supporting member,
   a fork support means secured to the outer end of said supporting member,
   a fork means having a plurality of parallel spaced tines thereon in substantially co-planar relation,
   a pair of said fork means retained in substantially equi-spaced relation on said member with said tines parallel to said supporting member,
   both of said fork means journalled for predetermined reciprocation in said equi-spaced relation on said member transverse to the axis of said supporting member,
   a hydraulic motor on said supporting member,
   a source of hydraulic energy,
   conduit means connecting said source of energy to said motor,
   a transmission means connecting said motor with each of said fork means for reciprocating the latter in opposite directions when said motor is energized whereby the insertion of said pair of fork means into fruit bearing tree stems above said fruit in close proximity therewith will oscillate the said stems and dislodge said fruit therefrom for descent by gravity when said motor is energized.

References Cited

UNITED STATES PATENTS

| | | | |
|---|---|---|---|
| 83,178 | 10/1868 | Lang | 56—337 |
| 2,544,443 | 3/1951 | Brateng | 56—330 |

RUSSELL R. KINSEY, *Primary Examiner.*

ANTONIA F. GUIDA, *Examiner.*